(12) United States Patent
Moiret

(10) Patent No.: US 9,567,721 B2
(45) Date of Patent: Feb. 14, 2017

(54) OFFSHORE WIND TURBINE FOUNDATION, CORRESPONDING OFFSHORE WIND TURBINE AND METHOD FOR THEIR INSTALLATION ON SITE

(71) Applicant: DCNS, Paris (FR)

(72) Inventor: Jacques Cyrille Moiret, Lanester (FR)

(73) Assignee: DCNS, Paris (FR)

( * ) Notice: Subject to any disclaimer, the term of this patent is extended or adjusted under 35 U.S.C. 154(b) by 904 days.

(21) Appl. No.: 13/856,114

(22) Filed: Apr. 3, 2013

(65) Prior Publication Data

US 2013/0266453 A1 Oct. 10, 2013

(30) Foreign Application Priority Data

Apr. 5, 2012 (FR) ...................................... 12 53163

(51) Int. Cl.
*E02B 17/00* (2006.01)
*E02D 27/42* (2006.01)
*E02B 17/02* (2006.01)

(52) U.S. Cl.
CPC ............. *E02B 17/021* (2013.01); *E02D 27/42* (2013.01); *Y02E 10/72* (2013.01)

(58) Field of Classification Search
CPC ................ E02B 17/021; E02B 17/0017; E02B 2017/0056; E02D 27/42; Y02E 10/72
USPC ........................................ 416/244 R; 405/198
See application file for complete search history.

(56) References Cited

U.S. PATENT DOCUMENTS

| 7,163,355 B2 * | 1/2007 | Ingle ..................... E02B 17/021 405/196 |
| 2005/0260040 A1 | 11/2005 | Ingle et al. |
| 2012/0213594 A1 * | 8/2012 | Vandenbulcke ........ E02D 13/04 405/228 |

FOREIGN PATENT DOCUMENTS

EP 2317123 A1 5/2011

* cited by examiner

*Primary Examiner* — Nicholas J Weiss
*Assistant Examiner* — Paul Thiede
(74) *Attorney, Agent, or Firm* — Knobbe, Martens, Olson & Bear, LLP

(57) ABSTRACT

An offshore wind turbine foundation comprising a platform carrying a support for the wind turbine tower in its central region, and a plurality of leg guides in its peripheral region; and a plurality of legs, each of which may be movable between a raised position for transport and lowered positions for resting on the seabed. Each leg is capable of freely sliding in its guide.

9 Claims, 3 Drawing Sheets

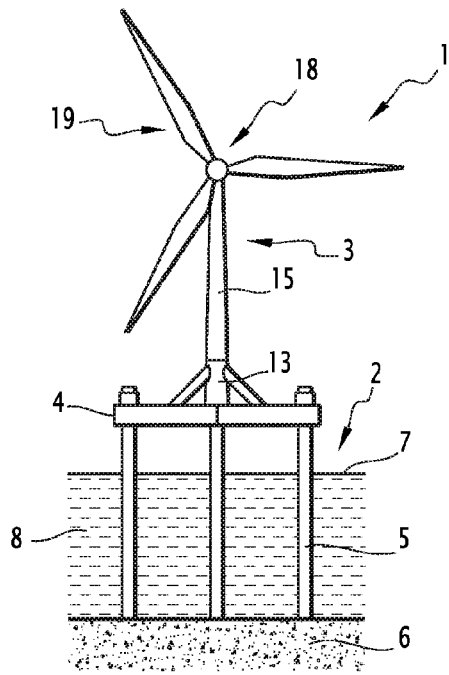
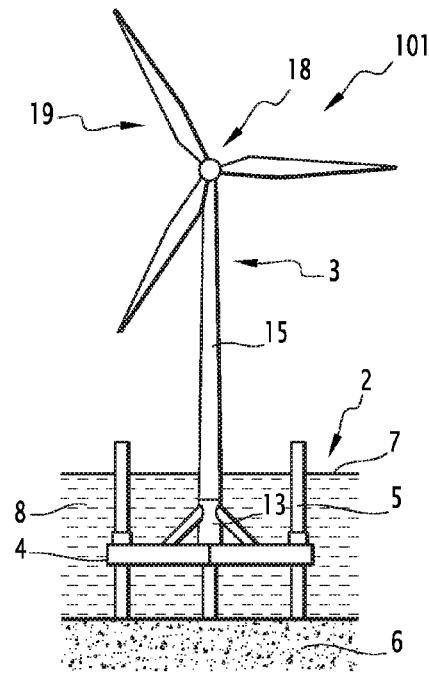
FIG.1
FIG.1A
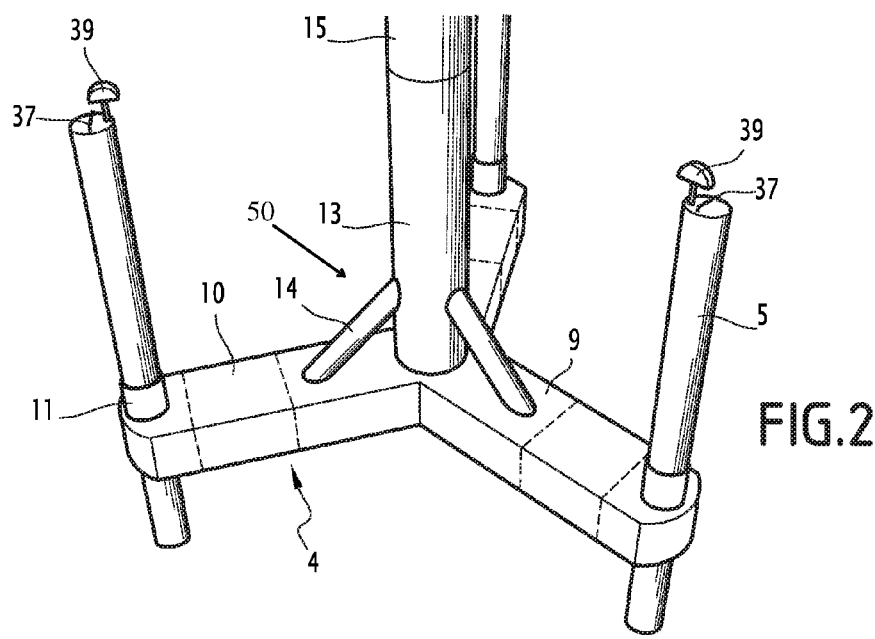
FIG.2

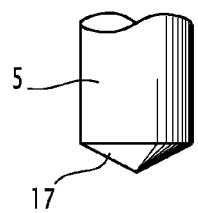
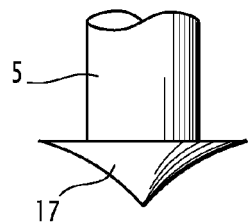
FIG.3A    FIG.3B
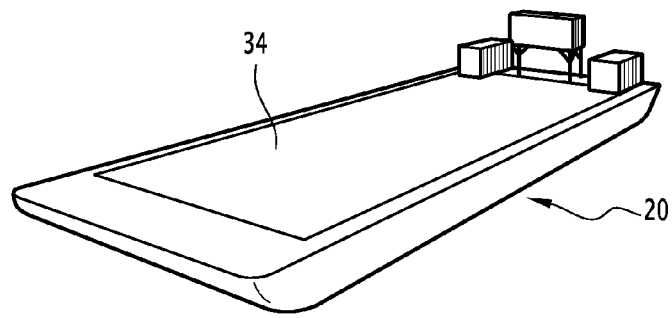
FIG.4
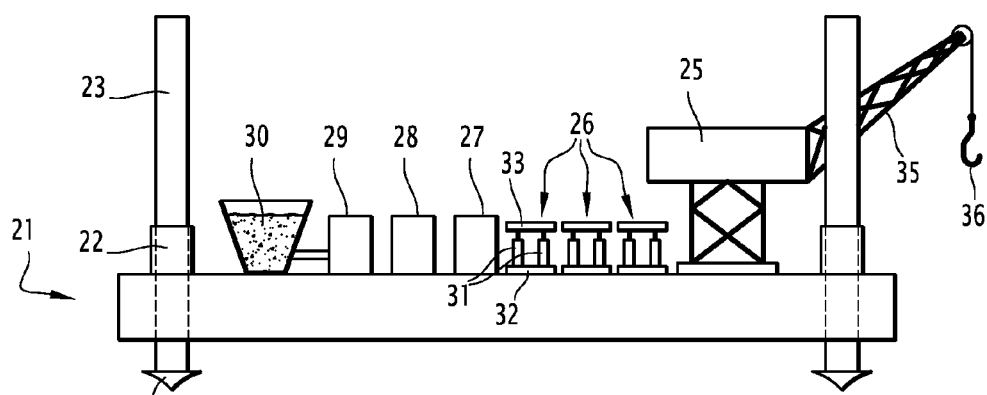
FIG.5

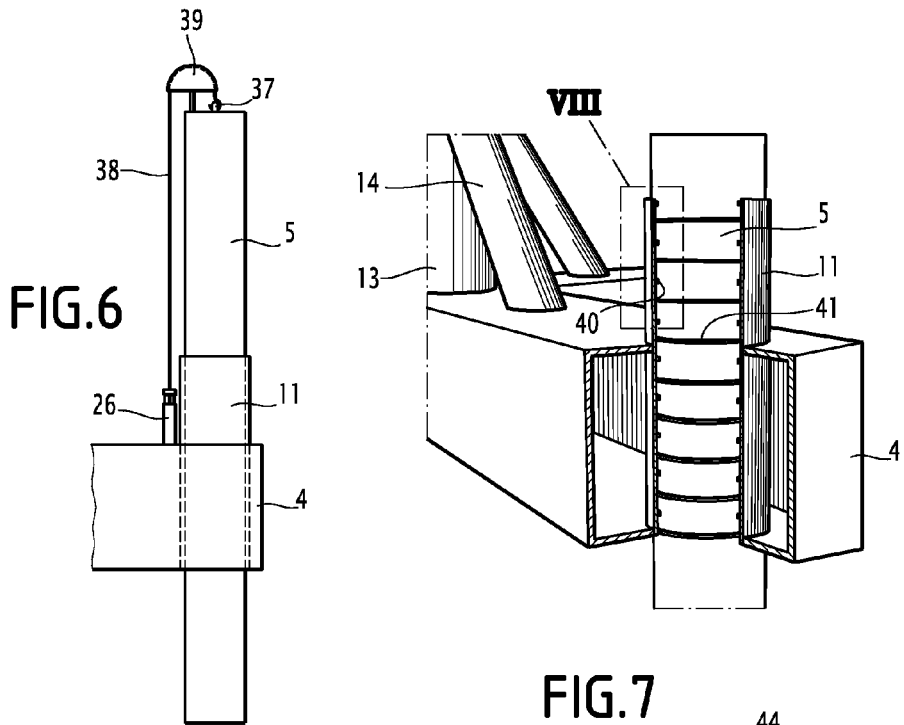
FIG.6
FIG.7
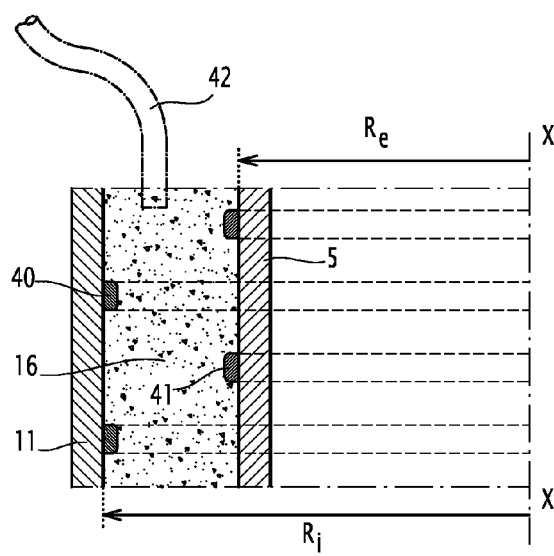
FIG.8
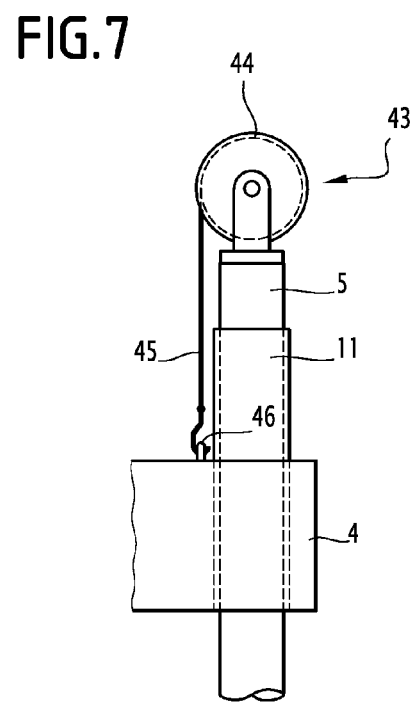
FIG.9

OFFSHORE WIND TURBINE FOUNDATION, CORRESPONDING OFFSHORE WIND TURBINE AND METHOD FOR THEIR INSTALLATION ON SITE

FIELD OF THE INVENTION

The present invention relates to offshore wind turbines and, in particular, an offshore wind turbine foundation.

BACKGROUND OF THE INVENTION

The document US-7 163 355 B2 describes a foundation of this type, in which each leg and its guide are equipped with a device for relative movement with multiple cylinders and racks.

When the foundation, or complete wind turbine reaches its site of operation, these movement devices make it possible to move each leg down until it makes contact with the seabed, and then raise the platform to the desired height above sea level.

This design therefore requires legs with complex structures and numerous cylinders, which are only used during installation on site and then left in place.

SUMMARY OF THE INVENTION

The invention aims to provide a solution that is more economical and easier to construct.

To this end, the invention aims to provide an offshore wind turbine foundation of the aforementioned type, characterised in that each leg is freely sliding in its guide.

In one embodiment, the foundation for an offshore wind turbine comprises:
 a platform carrying a support for a wind turbine tower in its central region, and a plurality of leg guides in its peripheral region,
 a plurality of legs each of which may be moved between a raised position for transport and lowered positions for resting on the seabed,
 wherein each leg is freely sliding in its guide and wherein the foundation comprises a lock for locking each leg in position in its guide.

The invention also relates to an offshore wind turbine comprising:
 a foundation as defined above,
 a wind turbine tower mounted on the tower support; and
 a nacelle rotor assembly mounted in the upper region of the tower.

In one embodiment, each leg is locked in place in its guide by a ring made of a curable material, such as concrete, cast in an annular space located between the leg and the guide.

In another embodiment, at least one of the facing cylindrical surfaces of the leg and of the guide is equipped with at least one relief projecting out towards the other of these surfaces.

In another embodiment, each of the cylindrical surfaces is provided with at least one circular ring constituting said relief, the rings of the two surfaces being offset vertically relative to each other.

One embodiment relates to a method for the on site installation of an off-shore wind turbine comprising:
 (a) transporting to the site of operation a foundation comprising:
  a platform carrying a support for a wind turbine tower in its central region, and a plurality of leg guides in its peripheral region,
  a plurality of legs, each of which may be moved between a raised position for transport and lowered positions for resting on the seabed, each leg being freely sliding in its guide, or a wind turbine that comprises:
 a foundation comprising:
  a platform carrying a support for a wind turbine tower in its central region, and a plurality of leg guides in its peripheral region,
  a plurality of legs each of which may be moved between a raised position for transport and lowered positions for resting on the seabed, each leg being freely sliding in its guide,
 a wind turbine tower mounted on the support of the tower, and
 a nacelle—rotor assembly mounted in the upper region of the tower, with the legs in the raised position;
 (b) transporting and positioning on the site of at least one work barge which carries:
  a crane; and
  for each leg, at least one device for relative movement of the leg in relation to the platform;
 (c) lowering each leg successively with the crane until it is resting on the seabed;
 (d) positioning of each relative movement device in a manner such that it cooperates with the associated leg and with the platform;
 (e) moving vertically the platform to its desired operational-service position by simultaneously actuating the relative movement devices;
 (f) locking the platform into position in relation to the legs; and
 (g) removing the relative movement devices from the foundation and the legs, and
 (h) placing the devices placed back on the work barge.

In one embodiment of the method, a work barge provided with a supply of curable material, such as concrete, and a pump for this material is used, and, after step (c), each leg is locked in place relative to the platform by injecting the material into an annular space located between the leg and the associated guide.

In another embodiment of the method, a work barge provided with a water pump is used, and, after step (c), the legs are packed by ensuring that the ballasts provided on the platform are filled up with seawater and then emptied of it in a repetitive manner.

In another embodiment of the method, the wind turbine has a submerged platform, wherein the method makes use of a work barge provided with a gravel pump, and, after step (e), the foundation is ballasted by filling the ballasts of the platform with gravel.

BRIEF DESCRIPTION OF THE DRAWINGS

Examples of embodiments of the invention shall now be described with reference made to the accompanying drawings, in which:

FIG. 1 schematically presents a perspective view of an off shore wind turbine according to the invention for which the platform is positioned above the water surface;

FIG. 1A is a similar view of a variant having a submerged platform;

FIG. 2 schematically presents on a larger scale, a perspective view from above, of the foundation of the wind turbine in FIG. 1;

FIGS. 3A and 3B present on a larger scale, in a side view, two possible configurations of the lower end of the legs of the foundation shown in FIG. 2;

FIG. 4 schematically presents a perspective view of a barge for transporting the wind turbine;

FIG. 5 schematically presents a side view of an associated work barge;

FIG. 6 schematically presents a side view of a relative movement device suitable for lifting the platform;

FIG. 7 schematically illustrates by means of a perspective view, the locking into position of the platform relative to the legs;

FIG. 8 presents on a larger scale, in a semi meridian cross sectional view, the detail VIII in FIG. 7; and FIG. 9 schematically presents a side view of a variant of the relative movement device.

DETAILED DESCRIPTION OF THE PREFERRED EMBODIMENT

The offshore wind turbine 1 shown in FIG. 1 consists of a foundation 2 and a superstructure 3. All the structural components of the wind turbine are constructed out of steel.

The foundation 2 comprises a platform 4 and three legs 5 for support on the seabed 6. In the example shown, the platform is designed to be positioned above the surface 7 of the sea 8, at a height that is greater than that reached by the highest waves expected in the region considered.

The platform 4 depicted in FIG. 2, has a regular star shaped form with three arms 9. Each arm is constructed out of metal sections and delineates a ballast cavity 10 whose functional role will become apparent in the following section/s.

Each arm 9 includes, in the vicinity of its free end, a vertical sleeve 11 which passes through the platform over its entire height and projects out upwards, above the upper surface of the latter. The lower end of the sleeve 11 is flush with the underside of the platform, as is shown in FIG. 6.

At its center, the platform 4 bears a support 50 comprising a tube 13 projecting out over its upper surface. This tube, is equipped with three buttresses 14, and receives and positions the base of the tower 15 of the superstructure 3.

Each leg 5 is constituted by a tube whose length is such that when it is resting on the seabed and if the platform is in its operational—service position, the upper end of the leg extends above the sleeve 11 as shown in FIG. 1. The outer radius $R_e$ of the tube (FIG. 8) is slightly smaller than the inner radius $R_i$ of the sleeve 11. Thus, the tube 5 is able to freely slide vertically in the sleeve, with an annular space 16 between them.

Each tube 5 is closed at its base by a foot 17 which may have various different configurations depending on the nature of the seabed. For example, the foot 17 may be conical and having the same diameter as the leg (FIG. 3A), or may be in the form of a sole enlarged at the central tip facing downwards (FIG. 3B).

As is known per se, the superstructure 3 comprises, in addition to the tower 15, a nacelle 18-rotor 19 assembly fixed to the upper end of the tower and equipped with an electric generator.

Indeed the wind turbine 1 obviously includes all of the plant and equipment necessary for accessing the platform, for processing the electricity generated, for control, handling, etc., that are common in the field of offshore wind turbines. These plant and equipment are not represented and shall not be described in greater detail.

The installation of the wind turbine thus described is carried out by means of a transport barge 20 (FIG. 4) and a work barge 21 (FIG. 5).

The transport barge 20 is a flat deck barge, for example self propelled and capable of transporting two complete wind turbines 1 right to their site of operation. As a variant, each wind turbine may be set afloat by means of a floating assembly of buoyancy chambers, and towed up to the site of operation.

The work barge 21 is a barge having smaller dimensions than the barge 20 and is for example self propelled and having a rectangular form. The barge 21 is provided at each corner with a sleeve 22 projecting upwards and passing through the barge. In this sleeve slides a tubular positioning leg 23 closed at its base by a foot. The barge 21 is provided with, for each leg, a mechanism for raising/lowering of the leg, for example of the rack and pinion type.

The barge 21 has a flat deck on which have been provided all of the various plant, apparatus and equipment required for the installation of the wind turbine: a crane 25, three lifting devices 26, a sea water pump 27, and a concrete pump 29 connected to a reservoir for concrete 30. As described here below, for the installation of a wind turbine with submerged platform, the barge 21 is also equipped with a gravel pump 28, while the devices 26 are replaced with lowering devices.

Each lifting device 26 is a linear winch which consists essentially of an assembly of vertical cylinders 31 and a cable assembly. The bodies of the cylinders are fixed to a lower horizontal plate 32, while the piston rods of the two cylinders are fixed to an upper horizontal plate 33. The plates 32 and 33 comprise unidirectional clamping means for clamping the cables. The alternative control for the cylinders makes it possible for the device to climb along the cables when they are hooked up to a fixed high point.

Such devices are well known in the field of building and public works and are, for example cable pull cylinders marketed by the company ENERPAC.

The barge 21 also has various actuation and control devices, which facilitate and enable the implementation of the steps for installing the wind turbine which shall now be described.

(1) The wind turbine is transported to its operating site by the barge 20, with the platform resting on the deck 34 of the barge and the legs 5 in the raised position. In this position, the feet 17 are located just below the level of the deck 34 and are therefore submerged. The legs are held in this raised position by appropriate temporary wedges that are not shown.

(2) The barges 20 and 21 are brought on site, the legs 23 of the barge 21 being in the raised position.

(3) The barge 21 is manoeuvred in a manner so as to position the boom 35 of the crane 25 on top of a first leg 5, and then the barge 21 is positioned by lowering its four legs 23 and is supported by the latter on the seabed.

(4) By means of its lifting hook 36, the crane seizes a suspension member 37 (FIG. 2) provided at the top of the leg 5, the wedges of this leg are removed therefrom, and the crane causes the lowering of the leg until it is resting supported on its foot 17 on the seabed. During this descent, the leg fills up with water through the openings provided over the length (height) of the leg.

(5) The crane then proceeds to seize a first movement device 26 and deposits it on the platform 4, in the immediate vicinity of the sleeve 11. A team attaches one end of the cables 38 (FIG. 6) to the member 37, passes them over a semi circular guide 39 fixed to the top of the leg (FIGS. 2 and 6), and passes them through the device 26. The bottom plate 32 of the device 26 is attached to the platform, in the proximity of the sleeve 11.

(6) The barge 21 is manoeuvred in order to bring the boom of the crane over a second leg, and is then positioned by means of its legs 23 and the steps (4) and (5) are repeated.

(7) The barge 21 to cause the operation of the crane boom above the third leg 5 and is positioned by means of its legs 23, and the steps (4) and (5) are repeated.

(8) The three linear winches 26 are actuated simultaneously in a manner such that they climb up slightly along the cables 38. This operation slightly raises the platform 4, which releases itself from the deck 34 of the barge 20. It is then removed.

(9) The legs 5, resting on the seabed, are packed with alternating stresses by the filling of seawater in the ballast 10 situated near each leg and contained in the platform, alternated with an emptying of the ballast.

For this purpose, by means of a pipe, the pump 27 of the barge 21 alternately fills and empties the ballasts 10 of the platform.

(10) The three linear winches 26 are actuated simultaneously in order to continue their ascent by rising along the cables 38. In doing so, they pull the platform 4, upwards until it reaches the desired altitude.

(11) The platform being thus in its final position, this position is locked in the following manner, as illustrated in FIGS. 7 and 8 for one of the legs 5.

The sleeve 11 is fitted in advance on the interior surface thereof, with a number of circular welded rings 40. The leg 5 is fitted in advance, on its exterior surface situated opposite to the sleeve 11, with a number of circular welded rings 41. The rings 41 are offset by about one half pitch in relation to the rings 40.

By means of a pipe 42, the pump 29 injects into the annular space 16 separating the leg 5 from the sleeve 11 the concrete withdrawn from the reservoir 30.

The same process is repeated for each leg. The setting of the concrete locks the platform in its position, in an extremely secure manner that is further enhanced by the presence of the rings 40 and 41.

As a variant, this locking into position of the platform can be achieved by way of using mechanical wedges.

(12) The three linear winches 26 are dismantled and removed, and the crane 25 carries them back on to the barge 21.

It should be noted that when this is necessary, the legs 23 of the barge 21 can be retracted in order for the barge to be rendered mobile again and to thus enable it to move from one leg 5 to the other and from one ballast 10 to the other.

The installation of the wind turbine 1 is thus completed. The barge 21 can be moved to the installation site of a new wind turbine, for example, of a similar wind turbine also carried by the barge 20.

The installation process described here above makes it possible to undertake construction on dry land of the entire wind turbine, and to reduce the cost thereof. In fact, the legs 5 are simple tubes that are able to slide freely in a sleeve of the platform, and the lifting devices 26, which are used only once for each wind turbine during its installation, are recovered and reused for the installation of all successive wind turbines.

When installing a wind turbine 101 with a submerged platform (FIG. 1A), as illustrated in FIG. 9, the linear winches 26 are replaced by simple drum 44 winches 43.

These winches, carried initially by the barge 21 are set in place and secured to the top of each leg after the descent of the latter, and then their cable 45 is fastened to a hook 46 provided on the platform in the vicinity of the sleeve 11.

Such winches 43 are used to enable the lowering of the platform 4 down to a position of service located below sea level.

Thus, in order to install the wind turbine, the steps (1) to (7) described here above are carried out. Then, instead of step (8), the barge 20 is to be ballasted in order for the wind turbine to be released therefrom and to allow for the barge 20 to be moved away. Step (10) is replaced by the simultaneous operation of the winches 43 in order to enable the lowering of the platform 4 down to the desired depth.

Finally, after step (12) of removal of the winches 43, an additional step is to be carried out as follows:

(13) By means of the gravel pump 28, gravel, that is contained either in a reservoir carried by the barge 21, or in an auxiliary barge, not shown, is sent by means of a pipe not shown into the ballast tanks 10 of the platform, so as to complete the ballasting of the wind turbine. The ballasts 10 may in this case be opened upwards.

Of course, in each case a number of relative movement devices 26, 43 may be associated with each leg 5.

The invention claimed is:

1. An offshore wind turbine assembly, comprising:
    a foundation comprising:
        a platform, said platform comprising, in its central region, a support configured to receive and position a wind turbine tower, said platform also comprising a plurality of guiding sleeves in a peripheral region; and
        a plurality of legs, each of which being configured to be moved between a raised position for transport and a lowered position for resting on a seabed,
        each of said plurality of legs being associated with one of the guiding sleeves of the platform, said plurality of legs being configured to freely slide in said guiding sleeves;
    a wind turbine tower mounted on the support comprised by the platform of the foundation, and
    a nacelle-rotor assembly mounted in an upper region of the wind turbine tower,
    wherein each leg of the foundation is locked in place in its associated guiding sleeve by a ring made of a curable material cast in an annular space located between facing cylindrical surfaces of the leg and the guiding sleeve.

2. The wind turbine according to claim 1, wherein at least one of the facing cylindrical surfaces of the leg and of its associated guiding sleeve is/are equipped with at least one relief projecting out towards the other of these surfaces.

3. The wind turbine according to claim 2, wherein each of the facing cylindrical surfaces are provided with at least one circular ring constituting said relief, the rings of the two facing cylindrical surfaces being offset vertically relative to each other.

4. The wind turbine according to claim 1, wherein the curable material is concrete.

5. A method for on-site installation of an off-shore wind turbine assembly, comprising:
    (a) transporting to a site of operation a foundation, the foundation comprising:
        a platform, said platform comprising, in its central region, a support configured to receive and position a wind turbine tower, said platform also comprising a plurality of guiding sleeves in a peripheral region; and
        a plurality of legs, each of which being configured to be moved between a raised position for transport and a lowered position for resting on a seabed, each of said plurality of legs being associated with one of the guiding sleeves of the platform, said plurality of legs being configured to freely slide in said guiding sleeves;

wherein the step (a) further includes each lea of the plurality of legs being transported to the site of operation in the raised position;

(b) transporting and positioning on the site of operation at least one work barge which comprises:
   a crane; and
   for each leg, at least one winch configured to cause relative movement of the leg in relation to the platform;

(c) lowering each leg successively with the crane until it is resting on a seabed;

(d) positioning each winch in a manner such that it cooperates with the associated leg and with the platform;

(e) vertically moving the platform to an operational service position by simultaneously actuating the winches;

(f) locking the platform into position in relation to the lowered plurality of legs;

(g) removing the winches from the plurality of legs, and (h) placing the winches back on the at least one work barge, wherein the at least one work barge is provided with a supply of curable material and a pump for the curable material, and wherein step (f) is carried out by injecting the curable material into an annular space located between each lowered leg and its associated guiding sleeve.

6. The method according to claim 5, wherein the at least one work barge is provided with a water pump, and wherein, after step (c), the lowered plurality of legs are packed by ensuring that the ballasts provided on the platform are filled up with seawater and then emptied of the seawater in a repetitive manner.

7. The method according to claim 5, wherein:
   the at least one work barge is provided with a gravel pump, and
   the method further comprises ballasting the foundation by filling the ballasts of the platform with gravel after step (e), and
   the operational service position of the platform is a submerged platform disposed in seawater between a surface of the seawater and the seabed.

8. The method according to claim 5, wherein the curable material is concrete.

9. The method according to claim 5, wherein
   the wind turbine tower is mounted on the support of the platform of the foundation disposed at the operational service position, and
   a nacelle-rotor assembly is mounted in the upper region of the wind turbine tower,
   wherein the foundation disposed at the operational service position, the mounted wind turbine tower, and the mounted nacelle-rotor assembly form the off-shore wind turbine assembly.

* * * * *